(No Model.)
W. Z. HAIGHT.
VALVE FOR PUMPS, &c.
No. 336,406. Patented Feb. 16, 1886.
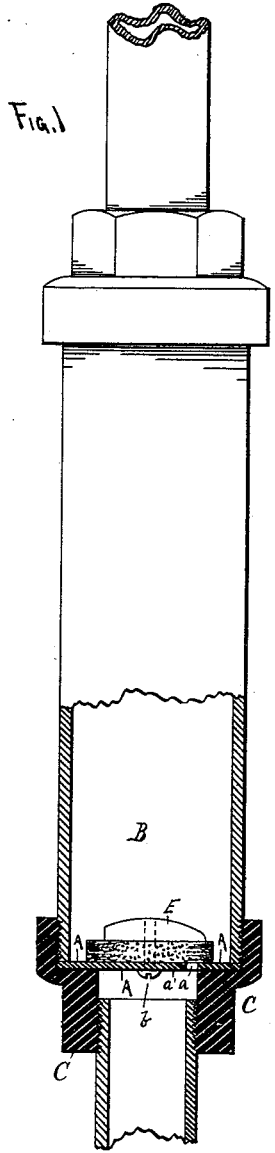
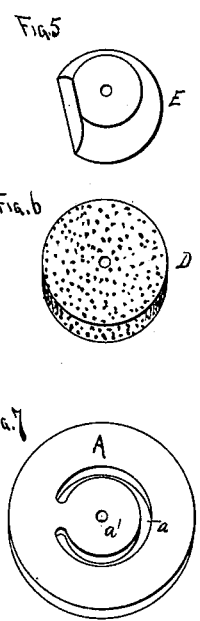
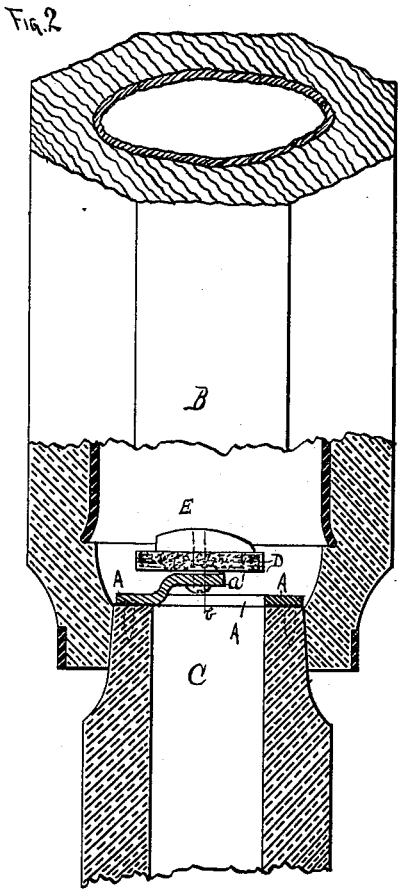
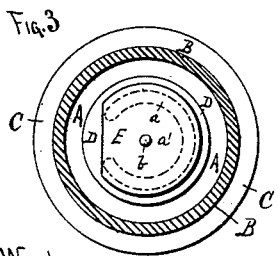
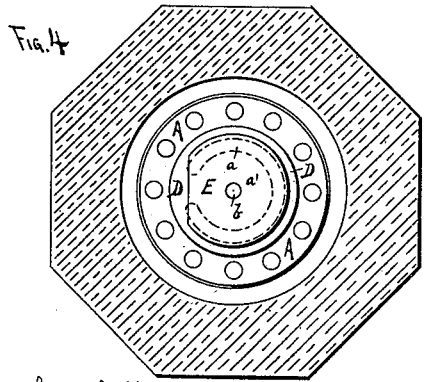
WITNESSES.
Louis Feeser Jr.
H. V. Rutherford
Washington Zechariah Haight
INVENTOR, By
Louis Feeser & Leo. Atty's.
N. PETERS, Photo-Lithographer, Washington, D. C.

UNITED STATES PATENT OFFICE.

WASHINGTON ZECHARIAH HAIGHT, OF WINNEBAGO CITY, MINNESOTA.

VALVE FOR PUMPS, &c.

SPECIFICATION forming part of Letters Patent No. 336,406, dated February 16, 1886.

Application filed October 20, 1883. Serial No. 109,546. (No model.)

*To all whom it may concern:*

Be it known that I, WASHINGTON ZECHARIAH HAIGHT, a citizen of the United States, and a resident of Winnebago City, in the county of Faribault, in the State of Minnesota, have invented certain new and useful Improvements in Valves for Pumps, &c., of which the following specification is a full, clear, and exact description, reference being also had to the accompanying drawings.

This invention relates to the valves for pumps, &c., more particularly those used in ordinary wells, cisterns, &c.; and it consists in the manner of constructing it, whereby the bearing-surfaces of both the valve and valve-seat are of leather, rubber, or other suitable flexible material, as hereinafter set forth.

In the drawings, Figure 1 is a side view, partially in section, of the valve, cylinder, &c., of an ordinary iron pump; and Fig. 2 is a similar view of an ordinary wooden pump. Figs. 3 and 4 are plan views in section of Figs. 1 and 2, respectively. Figs. 5, 6, and 7 are perspective views, detached, of the different parts of the valve.

In the ordinary valve with a metal seat and leather, rubber, or other flexible valve, the oxidation of the metal soon destroys the valve, and the working of sand, grit, and other foreign substances in between the valve and the seat causes them to leak; and to overcome these objections and many more is the object of my invention. A disk, A, is provided with a segmental slot, $a$, (see Fig. 1, which is a perspective view of the disk removed,) leaving a solid portion, $a'$, to form a hinge for the valve D, in the usual manner, which is secured thereto by a bolt, $b$, which also secures in place the ordinary metal plate or washer, E. The solid portion $a'$, to which the valve is secured, is joined to the disk A, which forms the valve-seat, by a narrow flexible neck, $a^2$, which latter forms the hinge on which the valve turns. In connection with this leather valve-seat and hinge I make the valve D of leather or equivalent flexible self-packing material, in the form of a thick disk, as shown, the disk being of sufficient thickness to give the valve firmness without bending out of shape. Should any sand, grit, or other foreign substance get in between the valve and seat, the soft material will close around the particles and prevent leakage, and then, when the valve again opens, the grit will be thrown out by the rising of the depressed portions of the valve and seat and carried off by the current, thus doing no injury to the valve, and not causing it to leak.

The valve may be made of one flexible self-packing material and the seat of another flexible self-packing, or both may be made of the same flexible self-packing, as circumstances and the work required of the pump may require.

This valve is applicable to cold or hot water, steam, hot or cold air, oil, gas, or any other substance which may be drawn through pumps, &c., and to any style of pump or similar device.

One advantage possessed by my manner of arranging the valve and seat is that the valve D is above the hinge. Consequently it is independent of it and enables the valve to seat itself equally on all sides, so that no unequal pressure occurs and even wearing of the valve is insured.

Another very marked advantage of my manner of forming the valve is that no cavities are left for the lodgment of sand and other foreign matter, but the current reaches every part, so that all such matter is carried off and not permitted to settle upon the valve-seat or other parts. Again, by securing the valve to the tongue $a'$ at or near the center of the seat or disk A, and connecting the tongue $a'$ to the seat A to one side of the point of attachment of the tongue and valve, the latter is permitted to rise in or approximately in a horizontal position and allow the water to enter on all sides of the valve.

I am aware that it is old to secure a valve to the lower side of a flexible tongue formed integral with a packing-ring, the valve being smaller than the opening in the packing-ring, and hence I make no claim to such a construction. By placing the valve above the flexible tongue, as described and claimed by me, the valve is permitted to rise while in horizontal position. This construction also permits the valve to seat itself equally on all sides, so that no unequal pressure occurs and even wearing of the valve is insured.

Having described my invention and set forth its merits, what I claim is—

In a pump-valve, the combination, with a flexible valve-seat having a central opening and a flexible tongue formed integral with the valve-seat and projecting into said opening, of a flexible valve greater in diameter than the opening in the seat secured to the upper side of the tongue at a point in or approximately in a line with the vertical center of the opening in said valve-seat, substantially as set forth.

In testimony whereof I have hereunto set my hand in the presence of two subscribing witnesses.

WASHINGTON ZECHARIAH HAIGHT.

Witnesses:
BART. J. REYNOLDS,
EBENEZER C. RYDER.